United States Patent [19]

Mirsky

[11] Patent Number: 5,135,679
[45] Date of Patent: Aug. 4, 1992

[54] LIQUID SCINTILLATION MEDIUM WITH A 1,2-DICUMYLETHANE SOLVENT

[76] Inventor: Jeffrey Mirsky, 65 Lakeshore Dr., Rockaway Township, Morris County, N.J. 07866

[21] Appl. No.: 468,726

[22] Filed: Jan. 24, 1990

[51] Int. Cl.$^5$ .............................................. C09K 11/02
[52] U.S. Cl. ........................... 252/301.17; 252/301.16
[58] Field of Search ...................... 252/301.17, 301.18, 252/301.16

[56] References Cited

U.S. PATENT DOCUMENTS

| | | | |
|---|---|---|---|
| 4,594,642 | 6/1986 | Ito | 252/576 |
| 4,657,696 | 4/1987 | Thomson | 252/301.17 |
| 4,867,905 | 9/1989 | Wunderly | 252/301.17 |
| 4,920,269 | 4/1990 | Perlman | 250/364 |

FOREIGN PATENT DOCUMENTS

0772196 of 1982 U.S.S.R. .
0475685 9/1982 U.S.S.R. .

OTHER PUBLICATIONS

*Nucleonics,* "Latest Developments in Scintillation Counting" Mar. 1952, pp. 36-37.

*Primary Examiner*—Prince Willis, Jr.
*Assistant Examiner*—Thomas Steinberg
*Attorney, Agent, or Firm*—Rohm & Monsanto

[57] ABSTRACT

A liquid scintillation medium contains 1,2-diphenylethane and derivatives thereof of general formula:

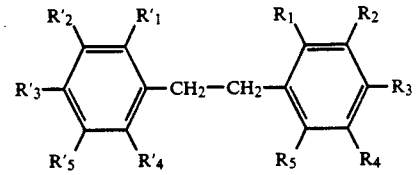

where the phenyl groups are substituted with hydrogen or lower alkyls (C1-3). In an illustrative embodiment, the liquid scintillation medium comprises at least 1,2 dicumylethane or 1-cumyl-2-phenylethane, the 1,2-diphenylethane compound being liquid at the temperatures of use, i.e., room temperature and below. There is also described a method of detecting beta-ray emissions using the scintillation medium of the present invention.

8 Claims, 1 Drawing Sheet

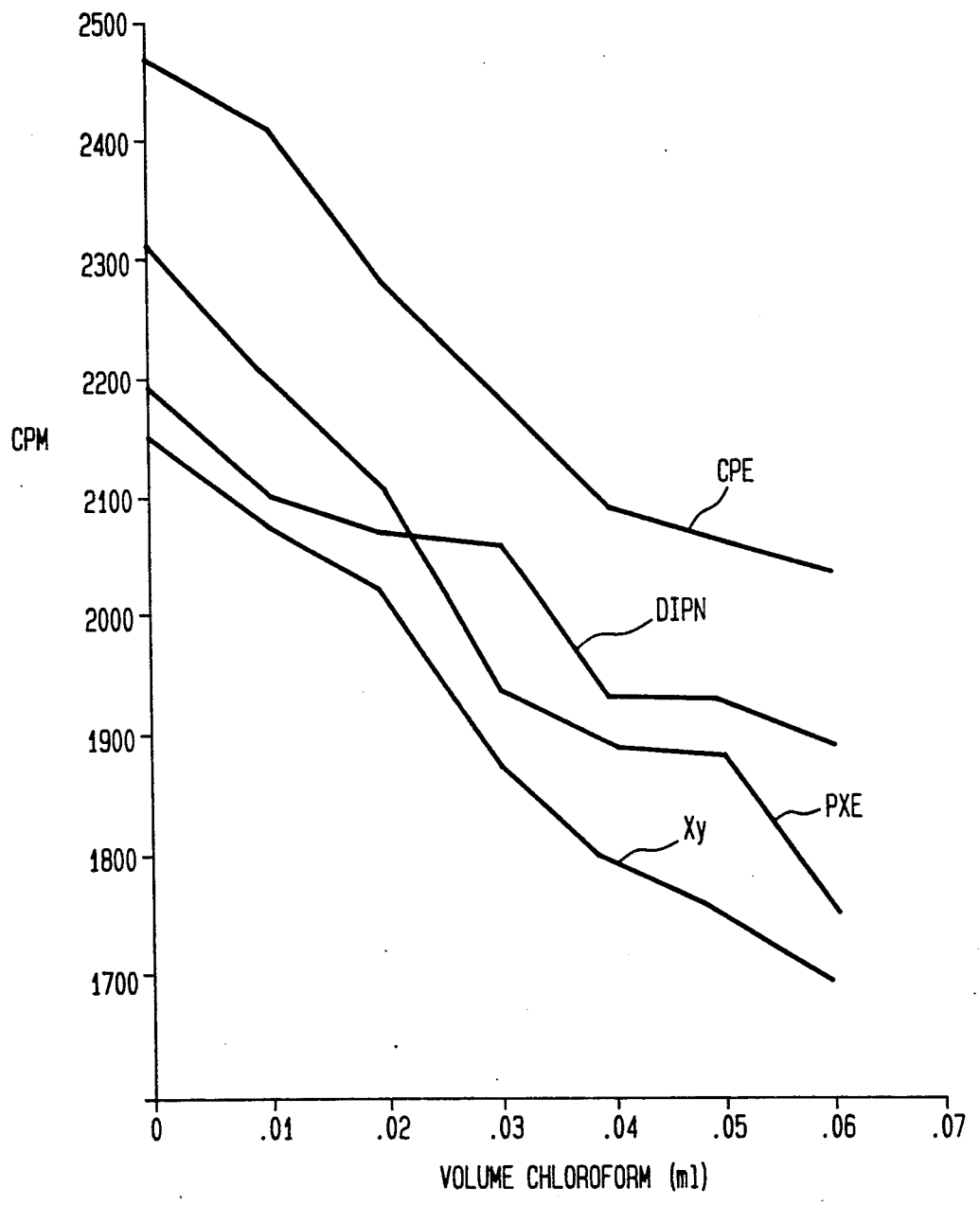

LIQUID SCINTILLATION MEDIUM WITH A 1,2-DICUMYLETHANE SOLVENT

BACKGROUND OF THE INVENTION

This invention relates generally to liquid scintillation media, and more particularly, to liquid scintillation media comprising 1,2-diphenylethane and derivatives thereof, and to methods of detecting beta-ray emissions using the novel liquid scintillation media.

Liquid scintillation counting is a well-known method for detecting and measuring the concentration of radioactive elements in a sample. It is a particularly useful technique for measuring low energy beta-emitting elements, such as $^3$H, $^{14}$C, $^{35}$S, and $^{32}$P. Liquid scintillation counting is accomplished by combining the radioactive sample to be analyzed with a liquid scintillation solution or media. The liquid scintillation media comprises, inter alia, an aromatic hydrocarbon scintillation solvent and a fluor. Energy from radioactive decay in the sample excites the aromatic solvent in the scintillation media which then transfers its increased energy to the scintillation fluor, or a combination of fluors. The fluor then releases the increased energy in the form of light pulses which are proportional to the amount of radioactivity in the sample. The light pulses are quantified, or counted, by conventional photomultipliers and associated circuitry, in a known liquid scintillation counter.

Well-known and commercially-used scintillation media typically comprise the following aromatic scintillation solvents: toluene, xylenes, ethylbenzenes, cumenes, pseudocumene, mesitylene, phenylcyclohexane, anisole, and dioxane containing a small portion of dissolved napahthalene.

The aforementioned scintillation solvents have many disadvantages, such as high vapor pressures and relatively low flash points making them dangerous and inconvenient to use. Moreover, these solvents are toxic and generate hazardous waste. An additional significant disadvantage is that these solvents have relatively high rates of permeation through the wall of polyethylene, polypropylene, or other plastic scintillation counting vials commonly used in the industry. Diffusion of the scintillation solvent through the wall of the vial results in an apparent error in the measurement of quenching. This error in turn leads to an error in the calculation of efficiency and, hence, in the calculation of decompositions per minute.

A more recently developed scintillation media comprises diisopropylnaphthalenes, as disclosed in U.S. Pat. No. 4,657,696 which issued to James Thomson on Apr. 14, 1987. However, diisopropylnaphthalenes have relatively long fluorescence decay times, and therefore, cannot respond quickly to a second excitation by another beta-ray until ground state is reached. As a consequence, the efficiency of this material in a scintillation media is reduced.

It is, therefore, an object of this invention to provide an improved liquid scintillation medium composition.

It is another object of this invention to provide an improved liquid scintillation medium composition which comprises a scintillation solvent having a lower vapor pressure and higher flash point than the scintillation solvents which are presently available.

It is also an object of this invention to provide an improved liquid scintillation medium composition which comprises a scintillation solvent which has lower toxicity to humans and animals and does not constitute hazardous waste.

It is a further object of this invention to provide an improved liquid scintillation medium composition which comprises a scintillation solvent which does not penetrate plastic scintillation vials, and which does not produce error in the measurement of quenching.

It is additionally an object of this invention to provide an improved liquid scintillation medium composition which comprises a scintillation solvent which has a short fluorescence decay time, and therefore can achieve higher counting efficiency, higher gross count capability, and greater quench-resistance.

It is yet a further object of this invention to provide an improved liquid scintillation medium composition which is relatively inexpensive and easy to produce.

It is also another object of this invention to provide an improved method for liquid scintillation detection and counting of beta-ray emissions.

SUMMARY OF THE INVENTION

The foregoing and other objects are achieved by this invention which provides a liquid scintillation medium comprising at least one 1,2-diphenylethane of the general formula:

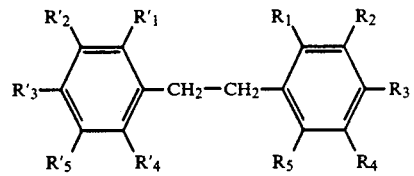

wherein $R_1$ to $R_5$ and $R_1'$ to $R_5'$ are each selected from the group consisting of H and $C_nH_{2n+1}$, where n is an integer from 1-3.

In preferred embodiments, the liquid scintillation medium comprises a 1,2-diphenylethane wherein at least one positional isomer, $R_1$ to $R_5$ and $R_1'$ to $R_5'$, is an isopropyl moiety. In certain preferred embodiments, the liquid scintillation medium comprises 1,2-dicumylethane and 1-cumyl-2-phenylethane.

In a specific illustrative embodiment of the invention, the liquid scintillation medium of the present invention comprises a novel 1,2-diphenylethane and a fluor which may be of any known composition. In certain additional embodiments, a secondary scintillator is included in the liquid scintillation medium.

In embodiments where the radioactive sample is aqueous, it is particularly preferred to add a surfactant to the liquid scintillation medium of the present invention.

In accordance with a method aspect of the present, a liquid scintillation process for detecting beta-ray emissions in a radioactive sample comprises the steps of:

(a) combining the radioactive sample and a liquid scintillation medium comprising at least one 1,2-diphenylethane of the general formula:

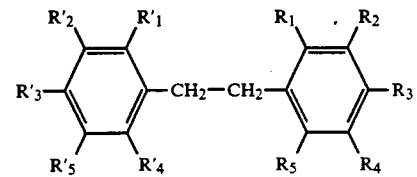

wherein $R_1$ to $R_5$ and $R_1'$ to $R_5'$ are each selected from the group consisting of H and $C_nH_{2n+1}$, where n is an integer from 1-3; and (b) measuring the radioactivity of the sample with a liquid scintillation counting apparatus of the type which is known in the art.

BRIEF DESCRIPTION OF THE DRAWING

Comprehension of the invention is facilitated by reading the following detailed description, in conjunction with the annexed drawing, in which the sole FIGURE is a graphical representation illustrating the counting efficiencies and resistance to the effect of chemical quenching with carbon tetrachloride of the prior art solvents diisopropylnaphthalene, 1-phenyl-1-xylylethane, and xylene, as compared to a novel scintillation solvent of the present invention, 1-cumyl-2-phenylethane.

DETAILED DESCRIPTION

The liquid scintillation medium of the present invention comprises a scintillation solvent which is a 1,2-diphenylethane, or derivative thereof, of the general formula:

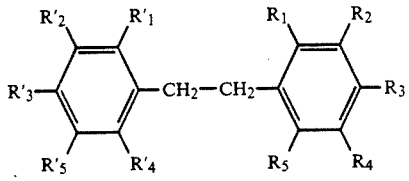

wherein the substituents $R_1$ to $R_5$ and $R_1'$ to $R_5'$ are each selected to be H or a lower alkyl radical, specifically methyl, ethyl, n-propyl, and isopropyl. All of the positional isomers of the aforementioned alkyls, or combination of such alkyls, on the basic 1,2-diphenylethane structure are within the contemplation of the invention. In certain embodiments, the scintillation solvent may comprise a combination of one or more solvents of the general formula. It is particularly advantageous that the scintillation solvent be liquid at room temperature and below (i.e., over the range where liquid scintillation counting might be accomplished in a refrigerated system).

Exemplary scintillation solvents within the contemplation of the present invention include, without limitation: 1,2-diphenylethane; 1,2-dicumylethane; 1,2-di(n-propylbenzyl)ethane; 1,2-diethylbenzylethane; 1,2-ditolylethane; 1,2-di(o-, m-, or p-xylyl)ethane; 1,2-mesitylethane; 1,2-dipseudocumylethane; 1,2-di(1,3,5-triethylbenzyl)ethane; 1-cumyl-2-phenylethane; 1-mesityl-2-phenylethane; 1-cumyl-2-mesitylethane; 1,2-dihexamethylbenzylethane; and so forth.

In certain preferred embodiments of the invention, the scintillation solvent comprises 1,2-dicumylethane or 1-cumyl-2-phenylethane.

All of the aforementioned 1,2 diphenylethane derivatives may be synthesized by techniques which are well known to persons of ordinary skill in the art. In the alternative, these solvents may be purchased commercially.

The scintillation medium may, in certain embodiments, function adequately without an additional fluor. In preferred embodiments, however, the scintillation medium contains an additional fluor. The present invention is not limited in its scope to the use of any particular fluor or combination of fluors. Examples of well-known fluors, useful in the practice of the invention, include p-terphenyls; oxazoles, such as [2,5-diphenyloxazole]; and oxadiazoles, such as [2-(4-biphenyl)-5-phenyl-1,3,4-oxadiazole] or 2-(4'-t-butylphenyl)-5-(4'-biphenyl)-1,3,4 oxadiazole.

The scintillation medium may also contain a secondary scintillator, or wavelength shifter, such as 1,4-di(2-methylstyryl)benzene or 2,5-di(biphenyl)-oxazole, or combinations of wavelength shifters which are well known in the art. Other known wavelength shifters useful in the practice of the invention include 1,4-bis-2-(5-phenyloxazolyl)benzene; p-bis-2-(5,1-naphthyloxazolyl)benzene; 1,6-diphenyl-1,3,5-hexatriene; 2-(1-naphthyl)-5-phenyloxazole; and p-bis-(o-methylstyryl)benzene.

In embodiments wherein the scintillation medium is being formulated for use with aqueous samples, the medium may advantageously also contain one or more surfactants, such as a nonionic surfactant (ethoxylated alkyl phenols), ethoxylated alcohols, or other well known cationic (alkyl quaternary ammonium compounds) or anionic surfactants.

In still further embodiments wherein it is contemplated that a large volume of scintillation medium and/or sample will be used, the scintillation medium may also contain a non-scintillating solvent, such as mineral oil, which is useful as a diluent.

The varying components of the scintillation medium may be combined in proportions which vary over a wide range, but which are readily apparent to persons of ordinary skill in the art. Of course, such factors as cost, solubility, performance, etc. will enter into the determination. Typical scintillation media are described, for example, in the literature: *Liquid Scintillation Counting*, Bell, C. G. and Hayes, F. N. (eds.), Pergamon Press, New York, N.Y. (1958); *The Current Status of Liquid Scintillation Counting*, Bransome, E. D. (ed.), Brune & Stratton, New York, N.Y. (1970); Horrocks, D. L., *Applications of Liquid Scintillation Counting*, Academic Press, New York, N.Y. (1974); Neame, K. D. and Homewood, C. A., *Introduction to Liquid Scintillation Counting*, Butterworth, London, England (1974); Hayes, et al., *Science*, Vol. 117, p, 480 (1953); and Koike, Y., *Nucl. Inst. Methods*, Vol. 109, p. 269 (1973).

The scintillation media of the present invention are advantageous in that they have relatively high flash points, low vapor pressure, low toxicity and do not constitute hazardous waste. Additionally, these solvents are characterized by short fluorescence decay times, thereby achieving high counting efficiencies, higher gross count capabilities, and high quench resistance.

The following illustrative examples are given by way of example, and are not to be construed as limiting the invention in any manner.

EXAMPLE 1

The following scintillation solution is useful for samples which are soluble in organic solvents.

| | |
|---|---|
| 1,2 dicumylethane | 1 liter |
| 2,5-diphenyloxazole | 5.00 g |
| 1,4-di-(2-methylstyryl)benzene | 0.05 g |

EXAMPLE 2

The following liquid scintillation solution, containing the surfactant nonylphenolethoxylate, is useful for samples which are aqueous-based.

| | |
|---|---|
| 1-cumyl-2-phenylethane | 600 ml |
| 2,5-diphenyloxazole | 5.00 g |
| 1,4-di-(2-methylstyryl)benzene | 0.20 g |
| nonylphenolethoxylate | 400 ml |

In accordance with a method aspect of the invention, there is also provided a method of detecting beta-ray emissions using a scintillation medium comprising at least one 1,2 diphenylethane or derivatives thereof, which is liquid at a temperature of 5° C. or below. The method includes the step of adding the radioactive specimen to the scintillation medium of the present invention to form a counting sample wherein the radioactivity of the counting sample is measured by a scintillation counting apparatus, such as the Tri-Carb Model 1500, Packard Instruments Corp., Downers Grove, Ill.

EXAMPLE 3

The effects of chemical quenching agents on the counting efficiency of the scintillation solutions of the present invention and several prior art scintillation solvents were measured under identical conditions using an internal source. FIG. 1 is a graphical representation of the counting efficiencies and resistance to the effect of chemical quenching with carbon tetrachloride which clearly demonstrates the superiority of an exemplary scintillation solvent of the present invention, 1-cumyl-2-phenylethane (CPE) as compared to the prior art solvents diisopropylnaphthalene (DIPN); 1-phenyl-1-xylylethane (PXE); and xylene (Xy).

Although the invention has been described in terms of specific embodiments and applications, persons skilled in the art can, in light of this teaching, generate additional embodiments without exceeding the scope or departing from the spirit of the claimed invention. For example, although described in terms of compositions useful for detecting low energy beta-emissions, the scintillation medium in some embodiments of the invention may contain a neutron-capture solute or a gamma-capture solute. Accordingly, it is to be understood that the drawing and description in this disclosure are proffered to facilitate comprehension of the invention, and should not be construed to limit the scope thereof.

What is claimed is:

1. A liquid scintillation medium comprising:
a scintillation solvent comprising at least one 1,2-diphenylethane of the general formula:

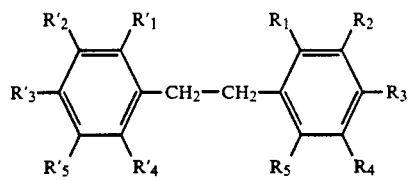

wherein $R_1$ to $R_5$ and $R_1'$ to $R_5'$ are selected from the group consisting of H and $C_nH_{2n+1}$, where n is an integer from 1-3, provided that at least one $R_1$ to $R_5$ and $R_1'$ to $R_5'$ is an isopropyl moiety; and at least one fluor.

2. The liquid scintillation medium of claim 1 wherein said at least one 1,2-diphenylethane is 1,2-dicumylethane.

3. The liquid scintillation medium of claim 1 wherein said at least one 1,2-diphenylethane is 1-cumyl-2-phenylethane.

4. The liquid scintillation medium of claim 1 further comprising a secondary scintillator.

5. The liquid scintillation medium of claim 1 further comprising a surfactant.

6. A method of detecting beta-ray emissions in a liquid scintillation process wherein the radioactivity of a sample is detected, comprising the steps of:
(a) combining the radioactive sample and a liquid scintillation medium, said liquid scintillation medium comprising at least one 1,2-diphenylethane of the general formula:

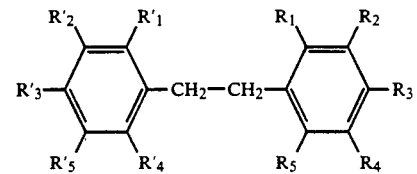

wherein $R_1$ to $R_5$ and $R_1'$ to $R_5'$ are each selected from the group consisting of H and $C_nH_{2n+1}$, where n is an integer from 1-3, provided that at least one $R_1$ to $R_5$ and $R_1'$ to $R_5'$ is an isopropyl moiety; and (b) measuring the radioactivity of the sample with a liquid scintillation counting apparatus.

7. The method claim 6 wherein said at least one 1,2-diphenylethane is 1,2-dicumylethane.

8. The method of claim 6 wherein said at least one 1,2-diphenylethane is 1-cumyl-2-phenylethane.

* * * * *